US010123099B2

(12) United States Patent
Cvejanovic et al.

(10) Patent No.: US 10,123,099 B2
(45) Date of Patent: Nov. 6, 2018

(54) METHOD AND DEVICE FOR SYNCHRONIZING SENSORS

(71) Applicant: Robert Bosch GmbH, Stuttgart (DE)

(72) Inventors: Dorde Cvejanovic, Munich (DE); Jan Hayek, Munich (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/570,552

(22) PCT Filed: Apr. 22, 2016

(86) PCT No.: PCT/EP2016/059060
§ 371 (c)(1),
(2) Date: Oct. 30, 2017

(87) PCT Pub. No.: WO2016/184641
PCT Pub. Date: Nov. 24, 2016

(65) Prior Publication Data
US 2018/0146269 A1 May 24, 2018

(30) Foreign Application Priority Data
May 19, 2015 (DE) .......... 10 2015 209 129

(51) Int. Cl.
*H04Q 9/08* (2006.01)
*H04L 12/24* (2006.01)
(Continued)

(52) U.S. Cl.
CPC .............. *H04Q 9/04* (2013.01); *G04F 1/005* (2013.01); *H04Q 2209/845* (2013.01); *H04Q 2213/1331* (2013.01); *H04Q 2213/13213* (2013.01)

(58) Field of Classification Search
CPC ........... H04Q 9/09; H04Q 2213/13214; H04Q 2209/845
See application file for complete search history.

(56) References Cited

U.S. PATENT DOCUMENTS 5,390,351 A * 2/1995 Di Giulio .......... G05B 19/0421
709/225
7,333,725 B1 2/2008 Frazier
(Continued)

FOREIGN PATENT DOCUMENTS

DE 102012207138 A1 10/2013
EP 2770339 A1 8/2014
(Continued)

OTHER PUBLICATIONS

Tae-Won Chun et al: "Algorithms for Minimizing the Effect of Network Delay of Sensor Data in Network-Based AC Motor Drive", IEEE Industrial Electronics, IECON 2006—23nd Annual Conference on, IEEE, Piscataway, NJ, USA, Nov. 1, 2006, pp. 4627-4631.
(Continued)

*Primary Examiner* — Brian S Roberts
*Assistant Examiner* — Abusayeed M Haque
(74) *Attorney, Agent, or Firm* — Norton Rose Fulbright US LLP; Gerard Messina

(57) ABSTRACT

A method for synchronizing sensors. A ratio of a first data rate of the first sensor to the second data rate of the second sensor is $2^n$, where n is an element from the set of natural numbers. A central timer is started. A first countdown timer is generated based on the central timer and the first data rate, and a second countdown timer is generated based on the central timer and the second data rate. The first countdown timer and the second countdown timer are started periodically. The measurement by the first sensor begins at the latest when a first latency equals the value of the first countdown timer, and the measurement by the second sensor begins at
(Continued)

the latest when the second latency equals the value of the second countdown timer.

14 Claims, 2 Drawing Sheets

(51) Int. Cl.
*H04L 5/14* (2006.01)
*H04W 84/18* (2009.01)
*H04L 12/801* (2013.01)
*H04Q 9/04* (2006.01)
*G04F 1/00* (2006.01)

(56) References Cited

U.S. PATENT DOCUMENTS

| | | | |
|---|---|---|---|
| 10,033,779 B2* | 7/2018 | Frusina | H04L 5/003 |
| 2003/0151513 A1* | 8/2003 | Herrmann | G08B 25/003 |
| | | | 340/573.1 |
| 2013/0211870 A1* | 8/2013 | Lawson | G06Q 10/06315 |
| | | | 705/7.25 |
| 2014/0105054 A1* | 4/2014 | Sægrov | H01Q 3/2605 |
| | | | 370/252 |
| 2015/0078204 A1* | 3/2015 | Thubert | H04L 5/0067 |
| | | | 370/255 |

FOREIGN PATENT DOCUMENTS

| | | |
|---|---|---|
| WO | 2010003372 A1 | 1/2010 |
| WO | 2012168294 A2 | 12/2012 |
| WO | 2013160073 A1 | 10/2013 |

OTHER PUBLICATIONS

International Search Report dated Jul. 12, 2016, of the corresponding International Application PCT/EP2016/059060 filed Apr. 22, 2016.
Tae-Won Chun et al: "Algorithms for Minimizing the Effect of Network Delay of Sensor Data in Network-Based AC Motor Drive", IEEE Industrial Electronics, IECON 2006—23nd Annual Conference on, IEEE, Piscataway, NJ, USA, Nov. 1, 2006, pp. 4627-4631, XP031077341.

* cited by examiner

METHOD AND DEVICE FOR SYNCHRONIZING SENSORS

BACKGROUND INFORMATION

The present invention is directed to a method for synchronizing sensors, in which the latency is determined and at least one first measured value of a first sensor is output synchronously with a second measured value of a second sensor.

Moreover, the present invention is directed to a device for synchronizing sensors, including at least one first sensor and a second sensor, a central timer, and a processing unit. The device is configured for determining a first latency of a first sensor and a second latency of a second sensor. In addition, the first sensor and the second sensor are configured for synchronously outputting a first measured value and a second measured value.

A generic method and a generic device are described in U.S. Pat. No. 7,333,725 B1, for example.

SUMMARY

The present invention is directed to a method for synchronizing sensors, in which the latency is determined and at least one first measured value of a first sensor is output synchronously with a second measured value of a second sensor.

In accordance with the present invention, a first data rate of the first sensor and a second data rate of the second sensor are acquired, the ratio of the first data rate to the second data rate being $2^n$, where n is an element from the set of natural numbers $N_0$. Furthermore, a first countdown timer is generated as a function of a value of the central timer and of the first data rate, and a second countdown timer is generated as a function of the value of the central timer and of the second data rate. The first countdown timer is provided for the first sensor, and the second countdown timer is provided for the second sensor, the measurement by the first sensor beginning at the latest when the first latency equals the value of the first countdown timer, and the measurement by the second sensor beginning at the latest when the second latency equals the value of the second countdown timer.

It is advantageous if all sensors are synchronous with one another and have a fixed data rate ratio of $2^n$. The sensors may be appropriately synchronized due to this condition for the data rates. In addition, in each case the time period between starting the measurement and outputting the acquired measured value may be kept as short as possible. Furthermore, due to generating the countdown timer as a function of the central timer and of the data rate of the particular sensor, there is no "jitter" or offset of the point in time at which measured values are output. As a result, when a measured value is present for a certain sensor, all measured values from other sensors that operate with the same or higher data rate are also present.

In one advantageous embodiment of the method according to the present invention, it is provided that the first latency is determined by measuring the duration from the response by the first sensor until the output of the first measured value, or also that the second latency is determined by measuring the duration from the response by the second sensor until the output of the second measured value.

It is advantageous that the latency may be determined particularly easily by clocking the time between starting the measurement and outputting the measured value.

In another advantageous embodiment of the method according to the present invention, it is provided that the first latency is determined by ascertaining from a table the duration from the response by the first sensor until the output of the first measured value, as a function of the configuration of the first sensor, or also that the second latency is determined by ascertaining from a table the duration from the response by the second sensor until the output of the second measured value, as a function of the configuration of the second sensor.

It is advantageous if the latency may be estimated very well with the aid of a table and based on the configuration of the sensor. Such an estimation may be carried out particularly quickly and easily. In addition, possible changes in the configuration, for example additional filtering steps, may be incorporated in the determination, and the determination of the latency may thus be adapted to the instantaneous measuring operation.

In another advantageous embodiment of the method according to the present invention, it is provided that the first countdown timer and the second countdown timer are generated by inverting the value of central timer 50 bit by bit, and utilizing a first number of lower bits for the first countdown timer as a function of the first data rate, and utilizing a second number of lower bits for the second countdown timer as a function of the second data rate.

It is advantageous that the first and second countdown timers may be preferably easily generated by the central timer and with incorporation of the data rates. In addition, the two countdown timers are also synchronous due to this implementation.

One advantageous embodiment of the method according to the present invention provides that the first sensor is placed into a sleep mode after the first measured value is output, when the first latency is less than the reciprocal of the first data rate, or also that the second sensor is placed into a sleep mode after the second measured value is output, when the second latency is less than the reciprocal of the second data rate.

It is advantageous that due to the sleep mode, energy may be saved, and the sensor measures only when necessary. This also preserves the sensor and protects it from continuous stress.

Another advantageous embodiment of the method according to the present invention provides that the first sensor is awakened at the latest when the value of the first countdown timer corresponds to the first latency, or also that the second sensor is awakened at the latest when the value of the second countdown timer corresponds to the second latency.

It is advantageous that the sensor may be awakened at the latest possible point in time at which, up to the expiration of the countdown timer, a measurement is still possible. In this way energy may be saved, and in addition the sensor need be activated only when necessary.

According to one advantageous embodiment of the method according to the present invention, it is provided that the first measured value and the second measured value, which are output at the same time, are combined into a data packet, in particular the data packet being provided with a time stamp. It is advantageous that the data packet, which contains measured values that are output at the same time, may be further processed particularly easily.

According to another advantageous embodiment of the method according to the present invention, it is provided that the data packet is transmitted to a FIFO memory.

It is advantageous that the acquired measured values are stored as data packets in the FIFO memory. For example, in each case the oldest measured values, which generally are the least relevant, are hereby overwritten. However, other operating modes of the FIFO are also conceivable.

Moreover, the present invention is directed to a device for synchronizing sensors, including at least one first sensor and a second sensor, a central timer, and a processing unit. The device is configured for determining a first latency of a first sensor and a second latency of a second sensor. In addition, the first sensor and the second sensor are configured for synchronously outputting a first measured value and a second measured value. In accordance with the present invention, the processing unit is configured for acquiring a first data rate of the first sensor and a second data rate of the second sensor, the ratio of the first data rate to the second data rate being $2^n$, where n is an element from the set of natural numbers $N_0$. In addition, the processing unit is configured for starting the central timer, for generating a first countdown timer as a function of a value of the central timer and of the first data rate, and for generating a second countdown timer as a function of the value of the central timer and of the second data rate. Furthermore, the processing unit is configured for providing the first countdown timer for the first sensor and for providing the second countdown timer for the second sensor, the measurement by the first sensor beginning at the latest when the first latency equals the value of the first countdown timer, and the measurement by the second sensor beginning at the latest when the second latency equals the value of the second countdown timer.

It is advantageous that all sensors are synchronous with one another and have a fixed data rate ratio of $2^n$. The sensors may be appropriately synchronized due to this condition for the data rates. In addition, in each case the time period between starting the measurement and outputting the acquired measured value may be kept as short as possible.

One advantageous embodiment of the present invention provides that the first sensor or the processing unit is configured for determining the first latency by measuring the duration from the response by the first sensor until the output of the first measured value, or also that the second sensor or the processing unit is configured for determining the second latency by measuring the duration from the response by the second sensor until the output of the second measured value.

It is advantageous that the latency may be determined particularly easily by clocking the time between starting the measurement and outputting the measured value.

Another advantageous embodiment of the present invention provides that the first sensor or the processing unit is configured for determining the first latency by ascertaining from a table the duration from the response by the first sensor until the output of the first measured value, as a function of the configuration of the first sensor, or also that the second sensor or the processing unit is configured for determining the second latency by ascertaining from a table the duration from the response by the second sensor until the output of the second measured value, as a function of the configuration of the second sensor.

It is advantageous that the latency may be estimated very well with the aid of a table and based on the configuration of the sensor. Such an estimation may be carried out particularly quickly. In addition, possible changes in the configuration, for example additional filtering steps, may be incorporated in the determination, and the determination of the latency may thus be adapted to the instantaneous measuring operation.

According to one advantageous embodiment of the present invention, it is provided that the first sensor is configured for going into a sleep mode after the first measured value is output, when the first latency is less than the reciprocal of the first data rate, or also that the second sensor is configured for going into a sleep mode after the second measured value is output, when the second latency is less than the reciprocal of the second data rate. It is advantageous that due to the sleep mode, energy may be saved, and the sensor measures only when necessary. This also preserves the sensor and protects it from continuous stress.

According to another advantageous embodiment of the present invention, it is provided that the first sensor is configured for being awakened at the latest when the value of the first countdown timer corresponds to the first latency, or also that the second sensor is configured for being awakened at the latest when the value of the second countdown timer corresponds to the second latency.

It is advantageous that the sensor may be awakened at the latest possible point in time at which, up to the expiration of the countdown timer, a measurement is still possible. In this way energy may be saved, and in addition the sensor need be activated only when necessary.

In one advantageous specific embodiment, it is provided that the device includes a FIFO memory, the processing unit being configured for transmitting the first measured value and the second measured value, which are output at the same time, as data packets to the FIFO memory, the data packet in particular being provided with a time stamp.

It is advantageous that the acquired measured values are stored as data packets in the FIFO memory. In each case the oldest measured values, which generally are the least relevant, are hereby overwritten.

DETAILED DESCRIPTION OF EXAMPLE EMBODIMENTS

Figure 1:
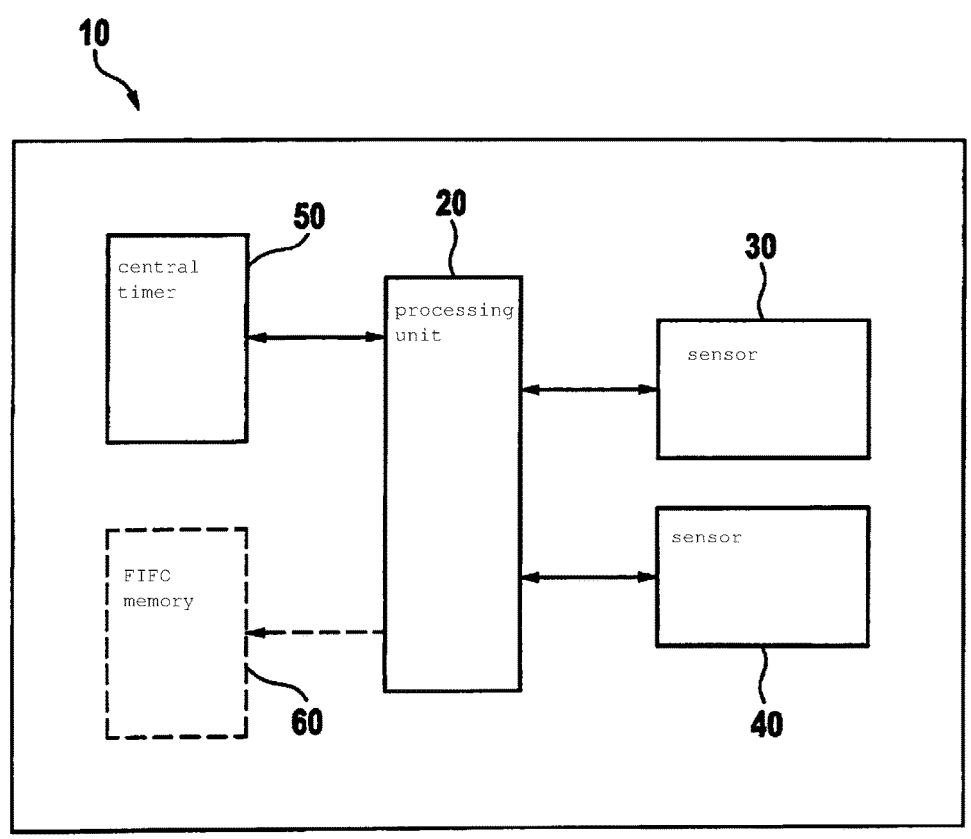
FIG. 1 shows a first exemplary embodiment of a device according to the present invention.

FIG. 1 shows a first exemplary embodiment of a device according to the present invention. A device 10 that includes a processing unit 20 is illustrated. Processing unit 20 is designed as a microcontroller, for example. Device 10 also includes a first sensor 30 and a second sensor 40, each being bidirectionally connected to processing unit 20. Via this bidirectional connection, sensors 30, 40 may be accessed by processing unit 20 or data may be transmitted to sensors 30, 40, and in addition measured values may be transmitted from sensors 30, 40 to processing unit 20. Furthermore, device 10 includes a central timer 50 which is likewise bidirectionally connected to processing unit 20. Via this bidirectional connection, on the one hand central timer 50 may be started, typically one time, by processing unit 20, and on the other hand a value of central timer 50 may be transmitted to processing unit 20. Central timer 50 is preferably implemented as a simple counter which increments at a predefined frequency. Optionally, the device also includes a FIFO memory 60 which is connected to processing unit 20 in such a way that at least processing unit 20 may transmit data to FIFO memory 60. In addition, FIFO memory 60 may be accessed either by processing unit 20 or externally, which is not depicted.

In one alternative exemplary embodiment not depicted, first sensor 30 and second sensor 40 are connected to processing unit 20 in such a way that data may be transmitted only from processing unit 20 to sensors 30, 40. In this case, however, first sensor 30 and second sensor 40 include a data line which may be led out of device 10 and externally tapped to be able to acquire the first measured value and the second measured value.

In another alternative exemplary embodiment not depicted, device 10 may also include any desired number of additional sensors which, the same as first sensor 30 and second sensor 40, are connected to processing unit 20.

Figure 2:
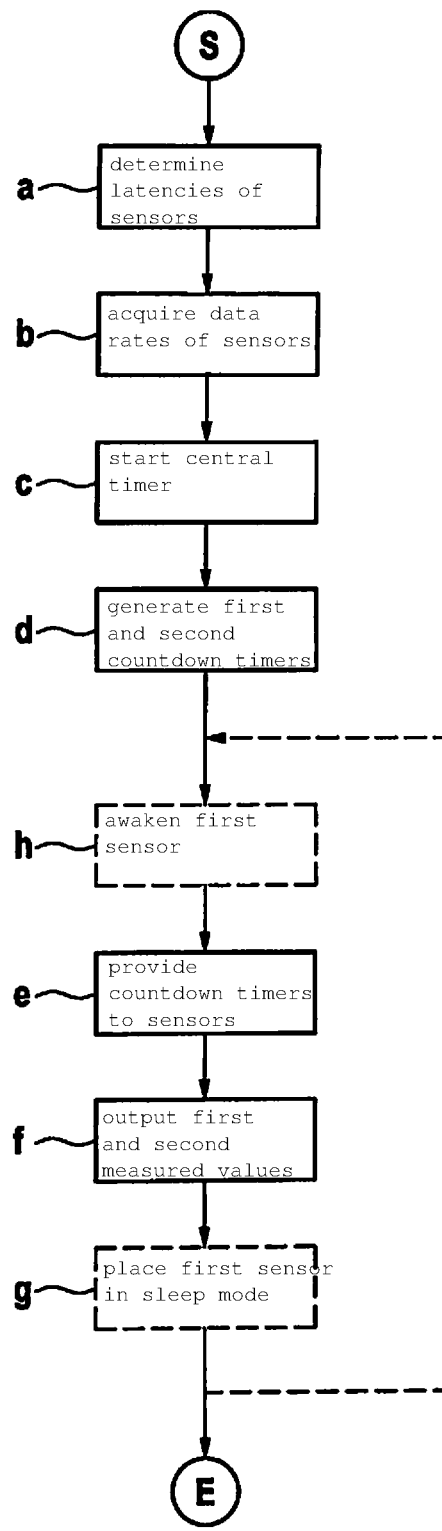
FIG. 2 shows a first exemplary embodiment of an operating procedure according to the present invention.

FIG. 2 shows a first exemplary embodiment of an operating procedure according to the present invention. At the start of the method, a first latency of a first sensor 30 and a second latency of a second sensor 40 are determined in a method step a. A latency may be determined, for example, by measuring the time the sensor requires from response by the sensor until output of the measured value. Alternatively, the latency may be determined based on the configuration of the sensor and with the aid of a table. This requires knowledge of which configuration the particular sensor has. "Configuration" is understood to mean the combination of individual steps of the measuring process of a sensor, for example filtering steps or interpolation computations. The times of each possible step are acquired by measurement or estimation before the method starts; these times are then entered individually into a table, from which the latency is subsequently determined in method step a. It is also possible to mix these alternatives for determining the latency, and thus, for example, to determine the first latency differently than the second latency. In addition, a first data rate of first sensor 30 and a second data rate of second sensor 40 are acquired in a subsequent method step b. The ratio of the first data rate to the second data rate is $2^n$, where n is an element from the set of natural numbers $N_0$, i.e., including the value zero. A central timer 50 which increments and which thus has a temporal value is then started in a method step c. Via central timer 50 it is also possible to carry out an age determination of measured values that are output. A first countdown timer is generated as a function of the value of central timer 50 and of the first data rate, and a second countdown timer is generated as a function of the value of central timer 50 and of the second data rate, in a subsequent method step d. Based on the first countdown timer or the second countdown timer, it may be accurately ascertained how long the first measured value of first sensor 30 or the second measured value of second sensor 40 must be present. Method step d may be implemented, for example, by inverting the value of central timer 50 bit by bit, and setting the upper bits of the inverted counter value to zero as a function of the data rate of the sensor. Thus, for example, central timer 50 may be incremented at a frequency of 25.6 kHz, and for a sensor with a data rate of 800 Hz, the lower 5 bits of the inverted value of the central timer may be taken as the countdown timer, and the remaining bits are operated at zero. In contrast, for a sensor with [a data rate of] 400 Hz, only the lower 4 bits, for example, are taken as the countdown timer. The first countdown timer is provided to first sensor 30, and the second countdown timer is provided to second sensor 40, in a subsequent method step e. First sensor 30 begins measuring at the latest when the value of the first countdown timer corresponds to the first latency. Likewise, second sensor 40 begins measuring at the latest when the value of the second countdown timer corresponds to the second latency. A first measured value of first sensor 30 and a second measured value of second sensor 40 are then output synchronously in a subsequent method step f. Method steps a through f follow one another in succession, although their sequence may also be interchanged in part. Thus, for example, method steps a through c may be arbitrarily interchanged. In addition, method step d may be shifted in such a way that it takes place at least after method steps b and c, but prior to method step e.

After method step f, first sensor 30 is optionally placed into a sleep mode in a method step g when the first latency is less than the reciprocal of the first data rate, or also second sensor 40 is placed into a sleep mode when the second latency is less than the reciprocal of the second data rate. Due to the condition that the latency is less than the reciprocal of the data rate, it is ensured that the time period between the response by the sensor and the output of a measured value is shorter than the time period between which a measured value of the sensor is to be acquired in each case. Optionally, between method step d and method step e a method step h may also run, in which first sensor 30 is awakened at the latest when the value of the first countdown timer corresponds to the first latency, or also in which second sensor 40 is awakened at the latest when the value of the second countdown timer corresponds to the second latency. It may be necessary to take into account, in addition to the latency, a time period until the sensor is ready to start with a measurement.

The method is terminated after method step f, or after method step g, if it is carried out. Optionally, the method may be continued, for example, with method step h, or also with method step a.

In one alternative exemplary embodiment not depicted, after method step f a further method step may take place in which the first measured value and the second measured value are combined into a data packet, the data packet preferably being provided with a time stamp. In a subsequent method step, the data packet may also optionally be transmitted to a FIFO memory 60, which may be externally accessed with the aid of a computer, for example.

What is claimed is:

1. A method for synchronizing sensors, comprising:
   (a) determining at least one first latency of a first sensor and a second latency of a second sensor;
   (b) acquiring at least one first data rate of the first sensor and a second data rate of the second sensor, a ratio of the first data rate to the second data rate being $2^n$, where n is an element from the set of natural numbers;
   (c) starting a central timer;
   (d) generating a countdown timer as a function of a value of the central timer and of the first data rate, and generating a second countdown timer as a function of the value of the central timer and of the second data rate;
   (e) providing the first countdown timer for the first sensor and providing the second countdown timer for the second sensor, a measurement by the first sensor beginning at the latest when the first latency equals a value of the first countdown timer, and a measurement by the second sensor beginning at the latest when the second latency equals the value of the second countdown timer; and
   (f) synchronously outputting a first measured value of the first sensor and a second measured value of the second sensor.

2. The method as recited in claim 1, wherein at least one of: (i) the first latency is determined in method step (a) by measuring the duration from the response by the first sensor until the output of the first measured value, and (ii) the second latency is determined in method step (a) by measuring the duration from the response by the second sensor until the output of the second measured value.

3. The method as recited in claim 1 wherein at least one of: (i) the first latency is determined in method step (a) by ascertaining from a table a duration from a response by the first sensor until the output of the first measured value, as a function of the configuration of the first sensor, and (ii) the second latency is determined in method step (a) by ascertaining from a table a duration from a response by the second sensor until the output of the second measured value, as a function of a configuration of the second sensor.

4. The method as recited in claim 1 wherein the first countdown timer and the second countdown timer are generated in method step (d) by inverting a value of the central timer bit by bit, and utilizing a first number of lower bits for the first countdown timer as a function of the first data rate, and utilizing a second number of lower bits for the second countdown timer as a function of the second data rate.

5. The method as recited in claim 1 wherein at least one of: (i) the first sensor is placed into a sleep mode after the first measured value is output, when the first latency is less than a reciprocal of the first data rate, and (ii) the second sensor is placed into a sleep mode after the second measured value is output, when the second latency is less than a reciprocal of the second data rate.

6. The method as recited in claim 1 wherein at least one of: (i) the first sensor is awakened at the latest when the value of the first countdown timer corresponds to the first latency, and (ii) the second sensor is awakened at the latest when the value of the second countdown timer corresponds to the second latency.

7. The method as recited in claim 1 wherein the first measured value and the second measured value, which are output at the same time, are combined into a data packet, the data packet being provided with a time stamp.

8. The method as recited in claim 7, wherein the data packet is transmitted to a FIFO memory.

9. A device for synchronizing sensors, the sensors including at least one first sensor and a second sensor, the device comprising: a central timer; and
a processing unit, wherein the device is configured for determining a first latency of a first sensor and a second latency of a second sensor, and the first sensor being configured for outputting a first measured value and the second sensor being configured for outputting a second measured value in synchronization with one another, and wherein the processing unit is configured to
acquire a first data rate of the first sensor and a second data rate of the second sensor, a ratio of the first data rate to the second data rate being $2^n$, where n is an element from the set of natural numbers, start the central timer, generate a first countdown timer as a function of a value of the central tinier and of the first data rate, and
generate a second countdown timer as a function of the value of the central timer and of the second data rate, and
provide the first countdown timer for the first sensor and provide the second countdown timer for the second sensor, the measurement by the first sensor beginning at the latest when the first latency equals a value of the first countdown timer, and the measurement by the second sensor beginning at the latest when the second latency equals the value of the second countdown timer.

10. The device as recited in claim 9, wherein at least one of: (i) one of the first sensor or the processing unit is configured to determine the first latency by measuring a duration from a response by the first sensor until the output of the first measured value, and (ii) one of the second sensor or the processing unit is configured for determining a second latency by measuring a duration from a response by the second sensor until the output of the second measured value.

11. The device as recited in claim 10, wherein at least one of: (i) one of the first sensor or the processing unit is configured to determine the first latency by ascertaining from a table the duration from the response by the first sensor until the output of the first measured value, as a function of a configuration of the first sensor, and (ii) one of the second sensor or the processing unit is configured to determine the second latency by ascertaining from a table the duration from the response by the second sensor until the output of the second measured value, as a function of the configuration of the second sensor.

12. The device as recited in claim 9, wherein at least one of: (i) the first sensor is configured to go into a sleep mode after the first measured value is output, when the first latency is less than a reciprocal of the first data rate, and (ii) the second sensor is configured for going into a sleep mode after the second measured value is output, when the second latency is less than the reciprocal of the second data rate.

13. The device as recited in claim 12, wherein at least one of: (i) the first sensor is configured to be awakened at the latest when the value of the first countdown timer corresponds to the first latency, and (ii) the second sensor is configured to be awakened at the latest when the value of the second countdown timer corresponds to the second latency.

14. The device as recited in claim 9, wherein the device includes a FIFO memory, the processing unit being configured to transmit the first measured value and the second measured value, which are output at the same time, as data packets to the FIFO memory, the data packet being provided with a time stamp.

* * * * *